(12) United States Patent
Shen et al.

(10) Patent No.: US 11,345,020 B2
(45) Date of Patent: May 31, 2022

(54) ROBOT CLUSTER SCHEDULING SYSTEM

(71) Applicants: Bozhon Precision Industry Technology Co., Ltd., Jiangsu (CN); Suzhou Bozhon Robot Co., Ltd., Jiangsu (CN)

(72) Inventors: Dongyu Shen, Jiangsu (CN); Yanyu Su, Jiangsu (CN); Jiancai Mao, Jiangsu (CN)

(73) Assignees: BOZHON PRECISION INDUSTRY TECHNOLOGY CO., LTD., Jiangsu (CN); SUZHOU BOZHON ROBOT CO., LTD., Jiangsu (CN)

( * ) Notice: Subject to any disclaimer, the term of this patent is extended or adjusted under 35 U.S.C. 154(b) by 0 days.

(21) Appl. No.: 16/628,465

(22) PCT Filed: Nov. 20, 2018

(86) PCT No.: PCT/CN2018/116499
§ 371 (c)(1),
(2) Date: Jan. 3, 2020

(87) PCT Pub. No.: WO2020/042385
PCT Pub. Date: Mar. 5, 2020

(65) Prior Publication Data
US 2021/0170575 A1     Jun. 10, 2021

(30) Foreign Application Priority Data
Aug. 28, 2018   (CN) .......................... 201810989933.6

(51) Int. Cl.
*B25J 9/00* (2006.01)
*G06F 16/28* (2019.01)
(Continued)

(52) U.S. Cl.
CPC ........... *B25J 9/0084* (2013.01); *B25J 9/1661* (2013.01); *G05B 19/41865* (2013.01);
(Continued)

(58) Field of Classification Search
CPC .................................... B25J 9/00; G06F 16/28
See application file for complete search history.

(56) References Cited

U.S. PATENT DOCUMENTS 9,513,627 B1 * 12/2016 Elazary ............... G05D 1/0289
2008/0141220 A1   6/2008 Kim et al.
(Continued)

FOREIGN PATENT DOCUMENTS

CN         103309350 A      9/2013
CN         104199428 A     12/2014
(Continued)

OTHER PUBLICATIONS

Supplemental European Search Report dated Mar. 3, 2021, International Application No. PCT/CN2018/116499 (12 pgs.).
(Continued)

*Primary Examiner* — Kira Nguyen
(74) *Attorney, Agent, or Firm* — Burns & Levinson LLP; Joseph M. Maraia

(57) ABSTRACT

A robot cluster scheduling system includes a user layer, an intermediate layer, an application layer, a plug-in layer and a data persistence layer. The intermediate layer includes a processor mapping module and a state acquisition module. The application layer includes a task scheduling module and a traffic scheduling module. The plug-in layer includes a task solving engine and a traffic planning engine. The task solving engine is configured to determine a target robot according to a parameter of a task and state data. The traffic planning engine is configured to determine a target route. The task solving engine and the traffic planning engine each provide an application programming interface (API).

17 Claims, 6 Drawing Sheets

(51) Int. Cl.
  *B25J 9/16*  (2006.01)
  *G05B 19/418*  (2006.01)
(52) U.S. Cl.
  CPC .. *G06F 16/284* (2019.01); *G05B 2219/39146* (2013.01); *G05B 2219/39167* (2013.01); *G05B 2219/39252* (2013.01)

(56) References Cited

U.S. PATENT DOCUMENTS

| | | | |
|---|---|---|---|
| 2014/0350831 A1* | 11/2014 | Hoffman | G05D 1/0027 701/117 |
| 2017/0050321 A1* | 2/2017 | Look | G06Q 10/0631 |
| 2018/0004202 A1 | 1/2018 | Onaga et al. | |
| 2018/0157266 A1* | 6/2018 | Xie | A47L 11/4005 |
| 2018/0311822 A1* | 11/2018 | Kaminka | B25J 11/008 |
| 2019/0310655 A1* | 10/2019 | Voorhies | B66F 9/063 |

FOREIGN PATENT DOCUMENTS

| | | |
|---|---|---|
| CN | 107450491 A | 12/2017 |
| CN | 108121330 A | 6/2018 |
| CN | 108227654 A | 6/2018 |
| JP | 2003001578 A | 1/2003 |

OTHER PUBLICATIONS

International Search Report from PCT Application No. PCT/CN2018/116499, dated Apr. 16, 2019.

* cited by examiner

ROBOT CLUSTER SCHEDULING SYSTEM

CROSS REFERENCE TO RELATED APPLICATIONS

This application is a United States national phase application under 35 U.S.C. 371 of co-pending International Patent Application Number PCT/CN2018/116499, filed on Nov. 20, 2018, which claims priority to Chinese Patent Application No. 201810989933.6, entitled "Robot Cluster Scheduling System", filed on Aug. 28, 2018, disclosures of which are incorporated herein by reference in their entireties for all purposes.

TECHNICAL FIELD

The present disclosure relates to robotics, for example, a robot cluster scheduling system.

BACKGROUND

With the development of communication technology and electronic technology, robots are increasingly used in the industrial field. In the application of robots, how to schedule robots is very important.

In the related art, a robot scheduling system includes a robot control system and an intermediate control system. The robot control system is configured to acquire robot management information from the intermediate control system, to generate a task instruction according to the robot management information, and to send the task instruction to a guided vehicle or an external device associated with the task instruction. The intermediate control system includes a first interface layer, an intermediate service processing layer and an access layer. The first interface layer includes a service interface configured to acquire a task package from the service management system. The intermediate service processing layer is configured to generate robot management information according to the task package acquired from the service management system. The access layer includes a control interface and is connected to the robot control system through the control interface.

However, in an aspect, the preceding robot scheduling system does not support a secondary development, and in another aspect, when sending a task instruction to the guided vehicle or the external device associated with the task instruction, the robot control system neither allocates a task according to parameters of the task instruction in an optimal manner nor allocates an optimal route to the robot, resulting in a relatively low efficiency of execution of the task after scheduling.

SUMMARY

The present disclosure provides a robot cluster scheduling system. The system can solve the problem of a relatively low efficiency of execution of the task after robot scheduling by a robot scheduling system in the related art.

One embodiment provides a robot cluster scheduling system. The system includes a user layer including a service object of the scheduling system, where the service object is a user or a robot; an intermediate layer including a processor mapping module and a state acquisition module; an application layer including a task scheduling module and a traffic scheduling module; a plug-in layer including a task solving engine and a traffic planning engine; and a data persistence layer.

The processor mapping module is configured to receive a task sent by the user or a traffic planning request sent by the robot, and write the task into the data persistence layer or forward the traffic planning request to the traffic scheduling module of the application layer after parsing the task or the traffic planning request. The state acquisition module is configured to receive state data of the robots and write the state data into the data persistence layer. The task scheduling module is configured to invoke the task solving engine after acquiring the task from the data persistence layer, and the task solving engine is configured to determine a target robot according to a parameter of the task and the state data and decompose the task into a subtask sequence and send the subtask sequence to the target robot. The traffic scheduling module is configured to invoke the traffic planning engine after receiving the traffic planning request from the processor mapping module, and the traffic planning engine is configured to determine a target route according to a parameter in the traffic planning request and the state data and send the target route to a robot that generates the traffic planning request. The task solving engine and the traffic planning engine each provide an application programming interface (API).

DETAILED DESCRIPTION

Figure 1:
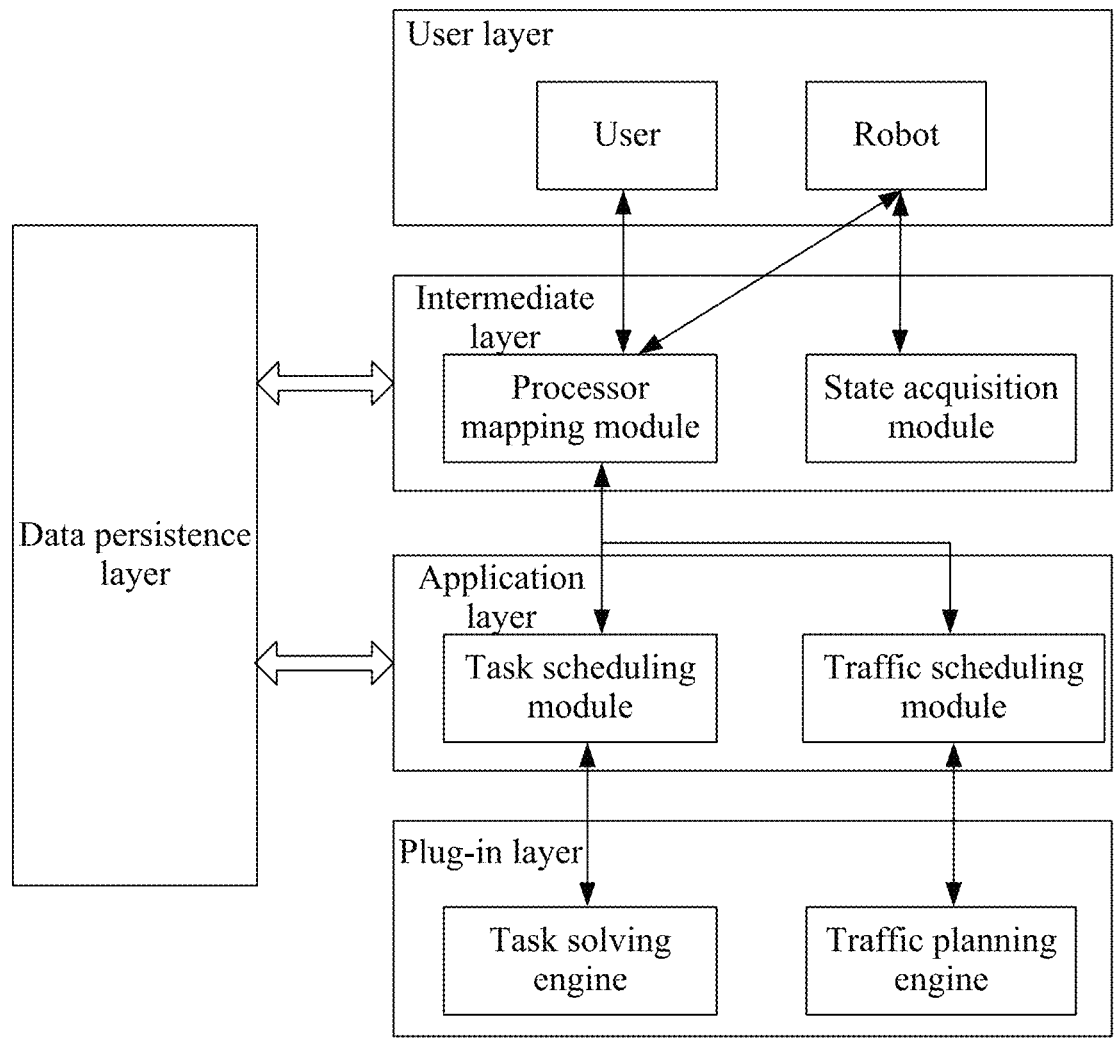
FIG. 1 is a structure diagram of a robot duster scheduling system according to an embodiment.

FIG. 1 is a structure diagram of a robot cluster scheduling system according to this embodiment. As shown in FIG. 1, the robot cluster scheduling system includes a user layer, an intermediate layer, an application layer, a plug-in layer and a data persistence layer.

The user layer includes a service object of the scheduling system. The service object is a user or a robot. The intermediate layer includes a processor mapping module and a state acquisition module. The application layer includes a task scheduling module and a traffic scheduling module. The plug-in layer includes a task solving engine and a traffic planning engine.

The processor mapping module is configured to receive a task sent by the user or a traffic planning request sent by the robot, and write the task into the data persistence layer or forward the traffic planning request to the traffic scheduling module of the application layer after parsing the task or the traffic planning request.

The state acquisition module is configured to receive state data of the robots and write state data into the data persistence layer.

The task scheduling module is configured to invoke the task solving engine after acquiring the task from the data persistence layer, and the task solving engine is configured to determine a target robot according to a parameter of the task and the state data and decompose the task into a subtask sequence and send the subtask sequence to the target robot.

The traffic scheduling module is configured to invoke the traffic planning engine after receiving the traffic planning request from the processor mapping module, and the traffic planning engine is configured to determine a target route according to a parameter in the traffic planning request and the state data and to send the target route to a robot that generates the traffic planning request.

The task solving engine and the traffic planning engine each provides an application programming interface (API).

In this embodiment, the system for scheduling the robot is a cluster scheduling system. The cluster scheduling system refers to a scheduling system using the cluster technology. A cluster is a group of computers independent of each other and interconnected by a high-speed network. The computers in the cluster form a group and are managed in a single-system mode. Cluster configuration can improve availability and scalability. Therefore, in this embodiment, the cluster technology is used to schedule the robot. This technology can improve the utilization ratio, stability and expandability of the scheduling system.

The cluster scheduling system of this embodiment can schedule multiple robots.

In the user layer of this embodiment, the user can send a task to the processor mapping module of the intermediate layer. The task here may be, for example, to have the robot go to a set position and fetch a particular item. The task sent by the user may include a task parameter. The types of the task parameter vary with different tasks. For example, when the task is to have the robot go to a set position and fetch a particular item, task parameters are the coordinates of the position and the name of the item.

The robot in the user layer may send a traffic planning request to the processor mapping module of the intermediate layer. In one scenario, when a robot is to arrive at a set position but does not know which path to follow to arrive fastest, the robot can send a traffic planning request to the processor mapping module. The traffic planning request may include the coordinates of the location to be reached and an identifier of the robot.

Figure 2A:
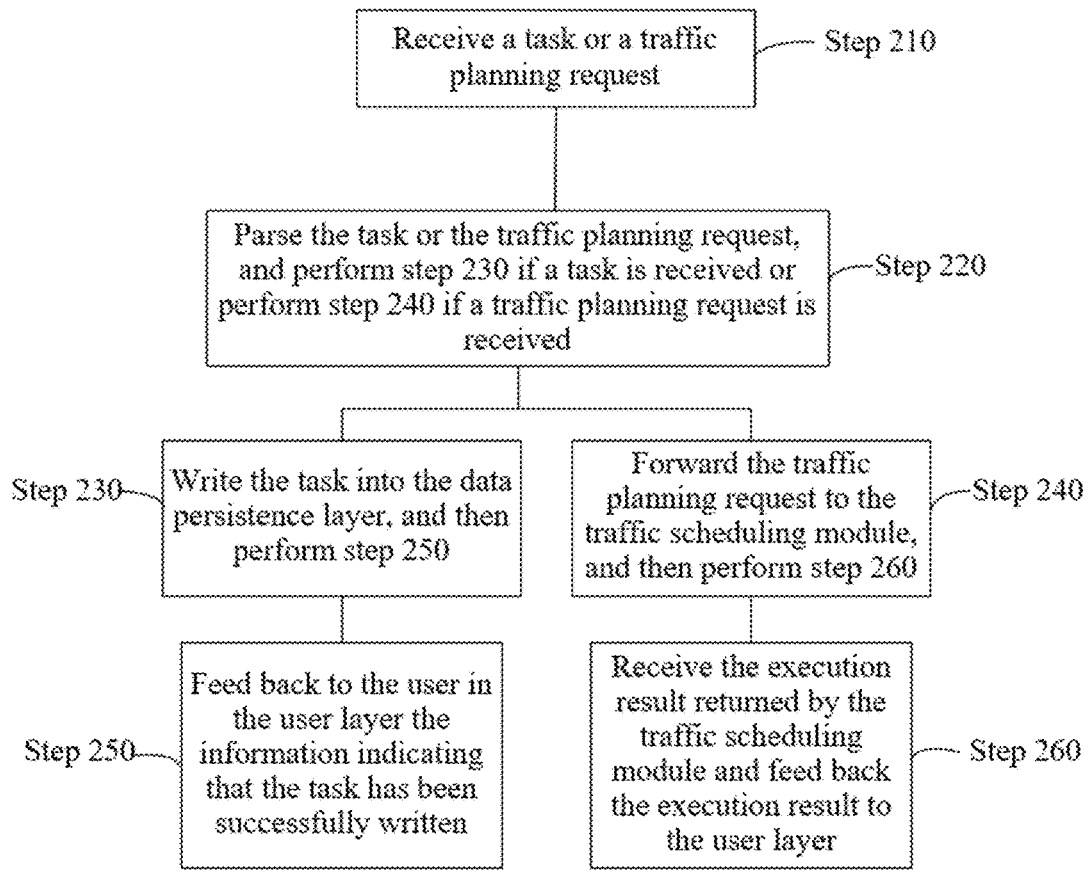
FIG. 2A is a flowchart of implementation by the processor mapping module of the embodiment shown in FIG. 1.

FIG. 2A is a flowchart of implementation by the processor mapping module of the embodiment shown in FIG. 1. As shown in FIG. 2A, when executed, the processor mapping module of this embodiment performs the steps described below.

In step 210, a task or a traffic planning request is received.

In step 220, the task or the traffic planning request is parsed. If a task is received, step 230 is performed. If a traffic planning request is received, step 240 is performed.

The purpose of the parsing is to identify whether the type of the acquired information is a task or a traffic planning request. In addition to the task parameter, the task may further include an identifier indicating that the information is a task. In addition to the coordinates of the location to be reached and the identifier of the robot, the traffic planning request may further include an identifier indicating that the information is a traffic planning request. The processor mapping module may parse the task or the traffic planning request according to the identifier in the identification field to determine the type of the information.

In step 230, the task is written into the data persistence layer, and then step 250 is performed. If the processor mapping module determines that a task is acquired, the task is written into the data persistence layer, and then the task waits to be acquired from the data persistence layer by the task scheduling module of the application layer.

In step 240, the traffic planning request is forwarded to the traffic scheduling module, and then step 260 is performed.

In step 250, after the task is written into the data persistence layer, the information indicating that the task has been successfully written is fed back into the user in the user layer.

In step 260, the execution result returned by the traffic scheduling module is received and the execution result is fed back to the user layer.

Setting step 250 and step 260 can improve the reliability of communication between the processor mapping module and the user.

Figure 2B:
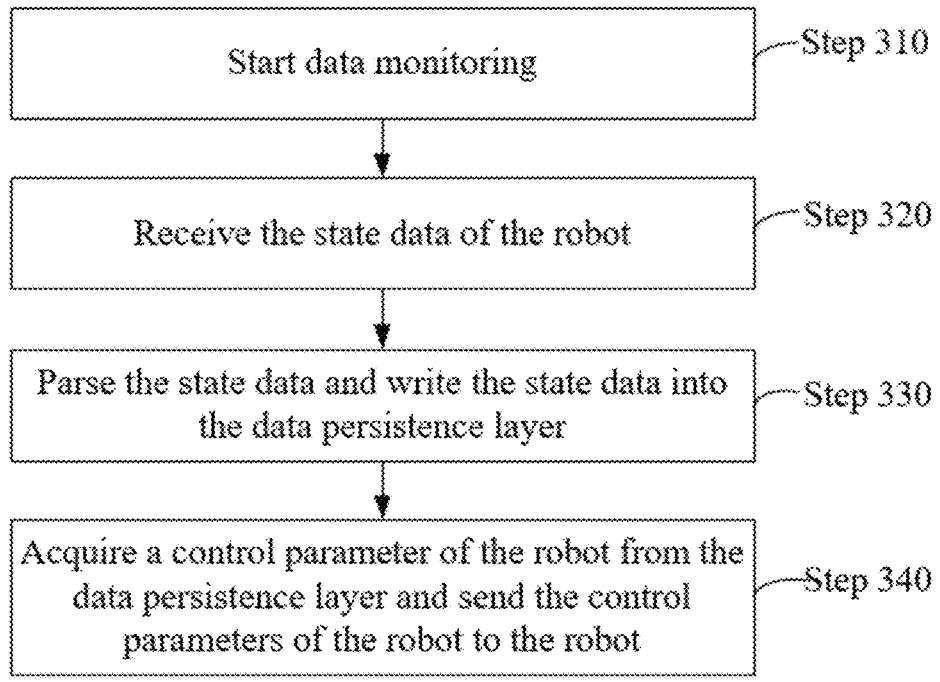
FIG. 2B is a flowchart of implementation by the state acquisition module of the embodiment shown in FIG. 1.

FIG. 2B is a flowchart of implementation by the state acquisition module of the embodiment shown in FIG. 1. As shown in FIG. 2B, when executed, the state acquisition module of this embodiment performs the steps described below.

In step 310, data monitoring is started.

After data monitoring is started, the state acquisition module can start receiving the state data of the robot.

In step 320, the state data of the robot is received.

The state data here may include the identifier of the robot, the position of the robot, the task being executed by the robot and the task execution state.

In step 330, the state data is parsed and written into the data persistence layer.

After parsing the acquired state data, the state acquisition module writes the state data into the data persistence layer.

In an embodiment, after writing the state data to the data persistence layer, the state acquisition module is further configured to perform the steps described below.

In step 340, the control parameter of the robot is acquired from the data persistence layer and sent to the robot.

The control parameter includes at least one of the following information: the control mode of the robot or the maximum speed of the robot. The control mode of the robot refers to whether the robot is in manual mode or in automatic mode.

Figure 2C:
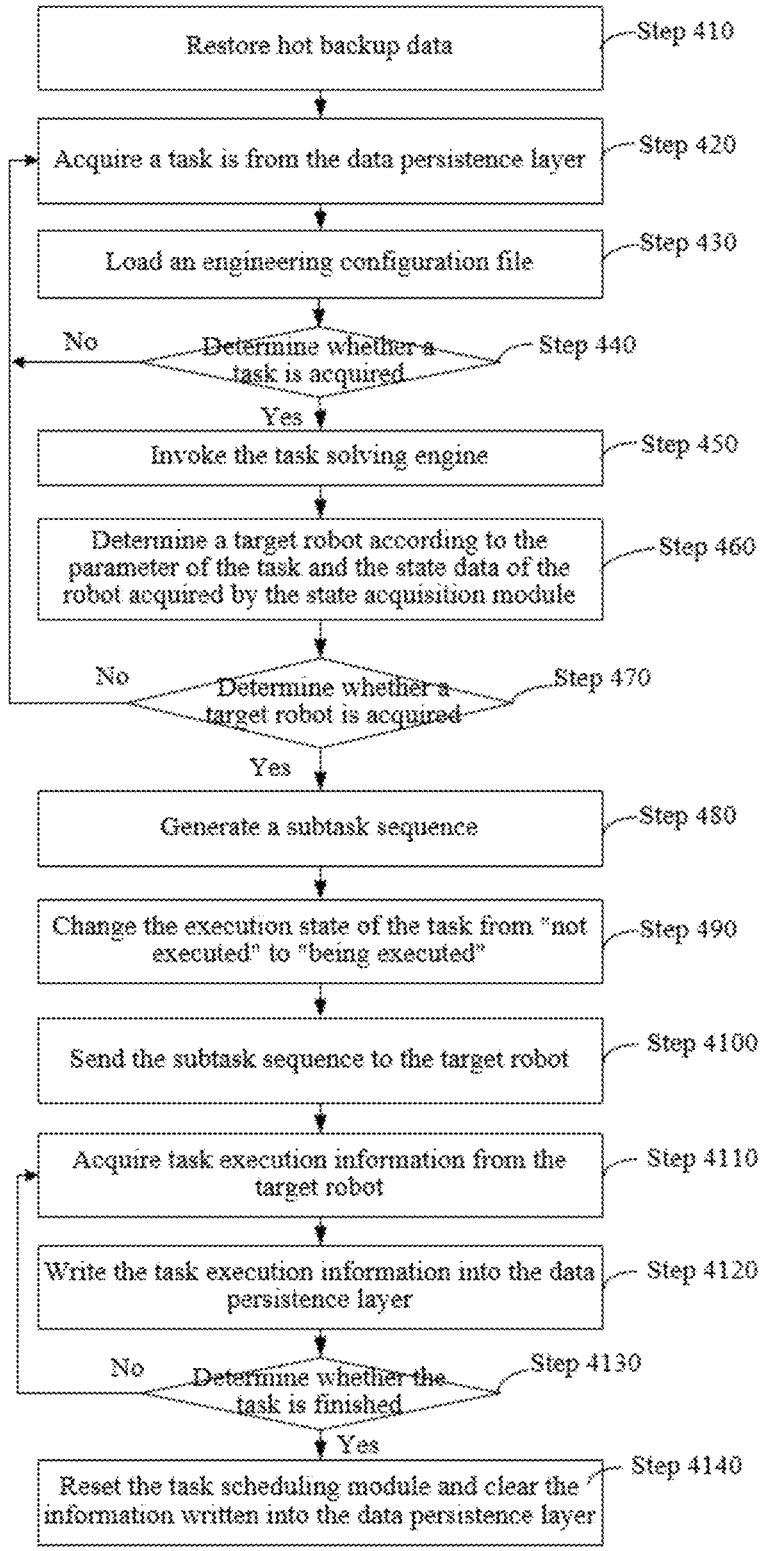
FIG. 2C is a flowchart of implementation by the task scheduling module of the embodiment shown in FIG. 1.

FIG. 2C is a flowchart of implementation by the task scheduling module of the embodiment shown in FIG. 1. As shown in FIG. 2C, when executed, the task scheduling module of the application layer of this embodiment performs the steps described below.

In step 410, hot backup data is restored.

After the cluster scheduling system crashes and restarts, step 410 needs to be performed so that historical state can be restored.

In step 420, a task is acquired from the data persistence layer.

In step 430, an engineering configuration file is loaded.

The data persistence layer further includes a description file that includes the engineering configuration file. The engineering configuration file here includes information such as map information, a robot list, and the number of robots.

In step 440, it is determined whether a task is acquired. If no task is acquired, the process returns to step 420, If a task is acquired, step 450 is performed.

In step 450, the task solving engine is invoked. The task solving plug-in that is available in the current system is configured in the engineering configuration file.

In step 460, after the task solving engine is invoked, a target robot is determined according to the parameter of the task and the state data of the robot acquired by the state acquisition module. In this step, information such as map information, a robot list, and the number of robots in the engineering configuration file needs to be invoked to serve as additional parameters needed by task solving of the task solving engine.

In step 470, it is determined whether a target robot is acquired. If no target robot is acquired, step 420 is performed. If it is determined that a target robot is acquired, step 480 is performed.

After the task solving engine is invoked, the task solving engine determines the target robot according to the parameter of the task and the state data of the robot acquired by the state acquisition module. The target robot of this embodiment refers to the best and most suitable robot for performing a task. The best and most suitable robot for performing a task refers to a robot that satisfies the condition of being closest to the target point or not performing a task at present.

In step 480, a subtask sequence is generated.

After it is determined that the target robot is acquired, the task scheduling module may acquire, by invoking the task solving engine, the subtask sequence generated according to the task. If it is determined that no target robot is acquired, no robot is suitable for executing the task. In this case, the process returns to step 420.

The task may consist of a series of subtasks. For a robot, subtasks are executable.

In an embodiment, the task execution information and the execution state of the task are also recorded in the data persistence layer. The task scheduling module is further configured to perform step 480 after the task is decomposed into a subtask sequence.

In step 490, the execution state of the task is changed from "not executed" to "being executed".

In step 4100, the subtask sequence is sent to the target robot.

The task scheduling module is further configured to perform step 4100 and step 4110 after the subtask sequence is sent to the target robot.

In step 4110, task execution information is acquired from the target robot.

The target robot may feed back the task execution information to the task scheduling module during execution of the task. The task execution information is configured to indicate which subtask in the subtask sequence the task is executed. For example, if one task is decomposed into a sequence composed of three subtasks, the task execution information may be as follows: the second subtask starts to be executed, the execution of the second subtask is completed, or the execution of the third subtask is completed.

In step 4120, the task execution information is written into the data persistence layer.

The step of writing the task execution information to the data persistence layer makes it easy for a user to query the execution state of the task and control the execution progress of the task later and thereby improves the user experience.

In step 4130, it is determined whether the task is finished. If the task is not finished, step 4100 is performed. If the task is finished, step 4140 is performed.

The task scheduling module determines from the task execution information whether the task is finished. When the task execution information indicates that the execution of the last one subtask is completed, it is determined that the task is finished.

In step 4140, the task scheduling module is reset and the information written into the data persistence layer is cleared.

Figure 2D:
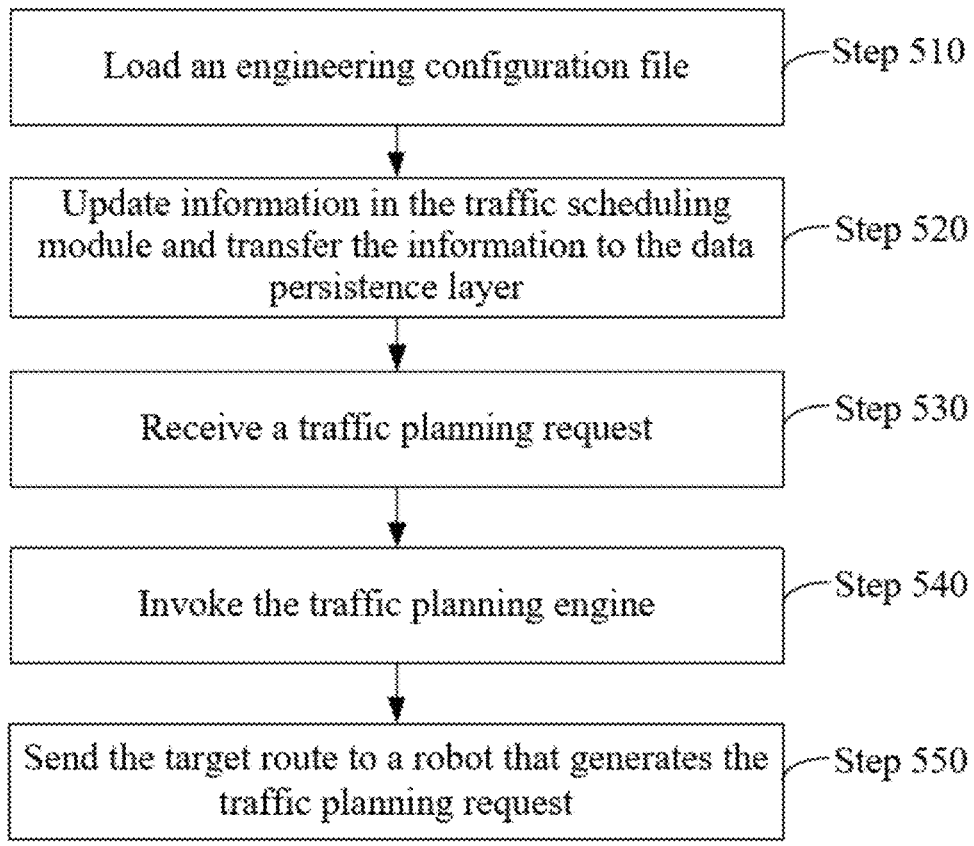
FIG. 2D is a flowchart of implementation by the traffic scheduling module of the embodiment shown in FIG. 1.

When it is determined that the task is finished, step 4140 of resetting the task scheduling module and clearing the information that is written, during execution of the task, into the data persistence layer is performed to facilitate execution of the next task and save storage space. When it is determined that the task is not finished, the process returns to step 4100, FIG. 2D is a flowchart of implementation by the traffic scheduling module of the embodiment shown in FIG. 1. As shown in FIG. 2C, when executed, the traffic scheduling module of the application layer of this embodiment performs the steps described below.

In step 510, an engineering configuration file is loaded.

The implementation process of this step is the same as that of step 430 and thus is not repeated here.

In step 520, information in the traffic scheduling module is updated and the information is transferred to the data persistence layer. Map information is loaded from the engineering configuration file.

In step 530, a traffic planning request is received. The traffic scheduling module receives the traffic planning request from the processor mapping module.

In step 540, the traffic planning engine is invoked. When the traffic planning engine is invoked, it is needed to load map information from the engineering configuration file.

After the traffic scheduling module invokes the traffic planning engine, the traffic planning engine can determine a target route according to the state data and the parameter in the traffic planning request.

In step 550, the target route is sent to a robot that generates the traffic planning request.

Figure 2E:
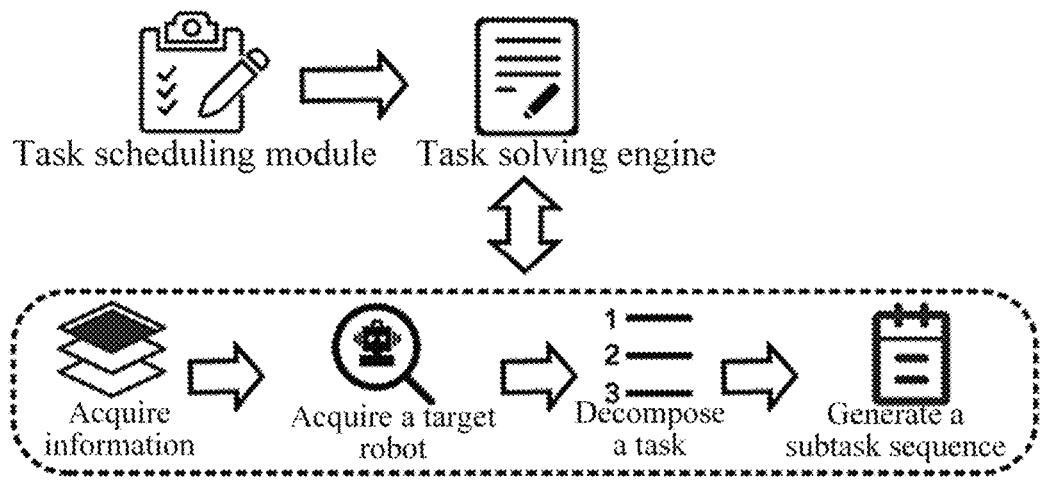
FIG. 2E is a flowchart of implementation by the task solving engine of the embodiment shown in FIG. 1.

FIG. 2E is a flowchart of implementation by the task solving engine of the embodiment shown in FIG. 1. As shown in FIG. 2E, after information acquisition, the task solving engine acquires a target robot (that is, determines a target robot according to parameter of the task and the state data) and decomposes the task into a subtask sequence.

The task solving engine generates a subtask sequence for the task in the two implementations described below.

In the first implementation, the task solving engine includes multiple task types and subtask sequence templates corresponding to the task types. Based on this implementation, the task solving engine decomposes the task into a subtask sequence and sends the subtask sequence to the target robot. In an embodiment, the task solving engine determines a subtask sequence template corresponding to the task according to the type of the task, substitutes the parameter of the task into the subtask sequence template corresponding to the task, obtains a subtask sequence corresponding to the task, and sends the subtask sequence to the target robot.

For example, the subtask sequence template for the task of fetching an item is: 1. to navigate to a set position and 2. to fetch the item. The required task parameter information includes the coordinates of the position and the name of the item. For example, the processor mapping module acquires the following type of task: to go to point A and fetch a cup, where the parameters of the task include the coordinates of point A and the cup. After acquiring the task, the task scheduling module invokes the task solving engine. The task solving engine determines the subtask sequence template according to the type of the task and fills in the subtask sequence template with the parameters of the task to obtain the task subsequence: 1. to navigate to point A (coordinates) and 2. to fetch a cup.

In the second implementation, the task solving engine includes an intelligent solution algorithm. The task solving engine decomposes the task into a subtask sequence and sends the subtask sequence to the target robot. In an embodiment, the task solving engine determines the subtask sequence according to the intelligent solution algorithm and the parameter of the task and sends the subtask sequence to the target robot.

The intelligent solution algorithm can obtain ask steps according to content of the task and environment information of the current robot, and thereby acquire the subtask sequence.

For example, the processor mapping module receives a task of fetching a cup. The task scheduling module invokes the task solving engine. The task parameter information is to fetch a cup. The task solving engine obtains the task steps: 1. to reach the position of the cup, 2. to take the cup and 3. to return to the starting point. In an embodiment, the task solving engine obtains environmental information including the position of the cup and the position of the robot. Finally, the subtask sequence generated by the task solving engine is: 1. to navigate to the position of the cup, 2. to take the cup and 3. to navigate to the starting point.

Figure 2F:
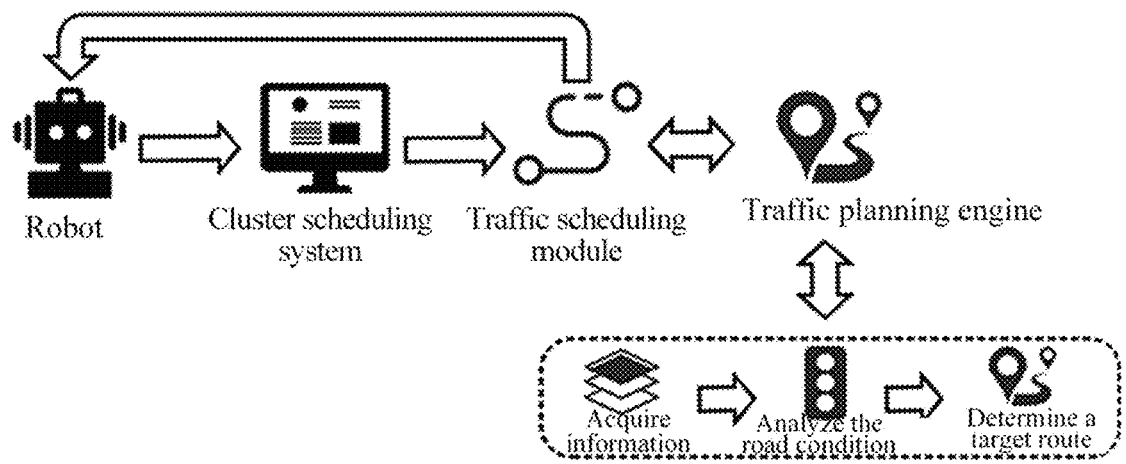
FIG. 2F is a flowchart of implementation by the traffic planning engine of the embodiment shown in FIG. 1.

FIG. 2F is a flowchart of implementation by the traffic planning engine of the embodiment shown in FIG. 1. As shown in FIG. 2F, the traffic planning engine analyzes the road condition and determines the target route according to the parameter in the traffic planning request. The target route of this embodiment may be a road name sequence consisting of road names or a route consisting of multiple coordinates.

In this embodiment, the task solving engine and the traffic planning engine each provide an API, The task solving engine and the traffic planning engine can be redeveloped through the API. That is, the robot cluster scheduling system provided in this embodiment is open.

In this embodiment, the intermediate layer, the application layer and the data persistence layer can all be implemented using the virtual container technology of the application container engine (Docker). Docker is an application container engine that provides a container solution. Based on the Docker container technology, this embodiment has the following advantages: 1. with the Docker container technology, the robot cluster scheduling system of this embodiment is easy to deploy; 2. with the Docker container technology, the resource utilization rate and the disaster tolerance of the system are improved; 3. with the Docker container technology, the robot cluster scheduling system of this embodiment has the automatic fault recovery capability; 4, with the Docker container technology, the robot cluster scheduling system of this embodiment has the rolling upgrade function.

The robot cluster scheduling system provided in this embodiment supports scheduling of robots having different structures.

The robot cluster scheduling system provided in this embodiment includes a user layer, an intermediate layer, an application layer, a plug-in layer and a data persistence layer. The user layer includes a service object of the scheduling system, where the service object is a user or a robot. The intermediate layer includes a processor mapping module and a state acquisition module. The application layer includes a task scheduling module and a traffic scheduling module. The plug-in layer includes a task solving engine and a traffic planning engine. The processor mapping module is configured to receive a task sent by the user or a traffic planning request sent by the robot, and write the task into the data persistence layer or forward the traffic planning request to the traffic scheduling module of the application layer after parsing the task or the traffic planning request. The state acquisition module is configured to receive state data of the robot and write the state data into the data persistence layer. The task scheduling module is configured to invoke the task solving engine after acquiring the task from the data persistence layer, and the task solving engine is configured to determine a target robot according to the parameter of the task and the state data and decompose the task into a subtask sequence and send the subtask sequence to the target robot. The traffic scheduling module is configured to invoke the traffic planning engine after receiving the traffic planning request from the processor mapping module, and the traffic planning engine is configured to determine a target route according to a parameter in the traffic planning request and the state data and to send the target route to a robot that generates the traffic planning request. The task solving engine and the traffic planning engine each provides an API. In this way, the following aspects are achieved: in one aspect, task solving and traffic planning are performed according to actual needs and the system has a low coupling degree; in another aspect, the target robot is determined according to a task so that robot tasks are optimally allocated and the task execution efficiency is improved after scheduling; in yet another aspect, the traffic route of a robot is intelligently planned so that traffic jams are prevented.

Figure 3:
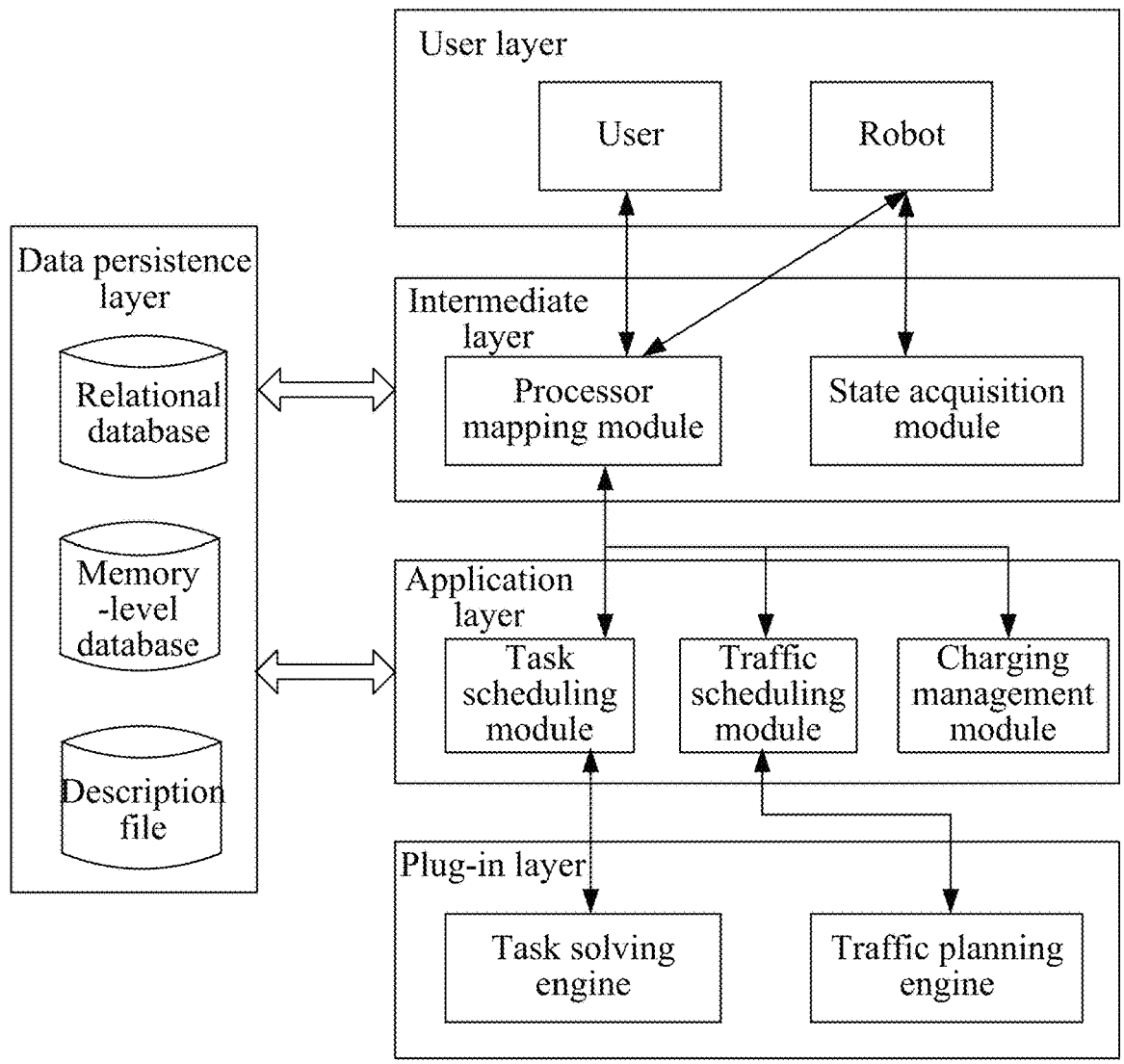
FIG. 3 is a structure diagram of a robot cluster scheduling system according to another embodiment.

FIG. 3 is a structure diagram of a robot duster scheduling system according to another embodiment. Based on the embodiment shown in FIG. 1, other modules of the robot cluster scheduling system are described in detail in this embodiment. In this embodiment, the state data acquired by the state acquisition module includes electric quantity data of multiple robots. As shown in FIG. 3, the application layer further includes a charging management module.

The charging management module is configured to determine, according to the electric quantity data of robots, whether the robots need to be charged, determine, in response to determining that there is a robot to be charged, the to-be-charged robot and determine whether a charging resource is available, and to generate a charging task when determining that the charging resource is available, write the identifier of the to-be-charged robot into the data persistence layer and send the charging task to the processor mapping module.

The charging task includes the identifier of the to-be-charged robot.

The processor mapping module is further configured to parse the charging task after receiving the charging task sent by the charging management module and to write the charging task into the data persistence layer. The task scheduling module is further configured to invoke the task solving engine after acquiring the charging task from the data persistence layer, and the task solving engine is configured to decompose the charging task into a charging subtask sequence and to send the charging subtask sequence to the robot corresponding to the identifier.

Figure 4:
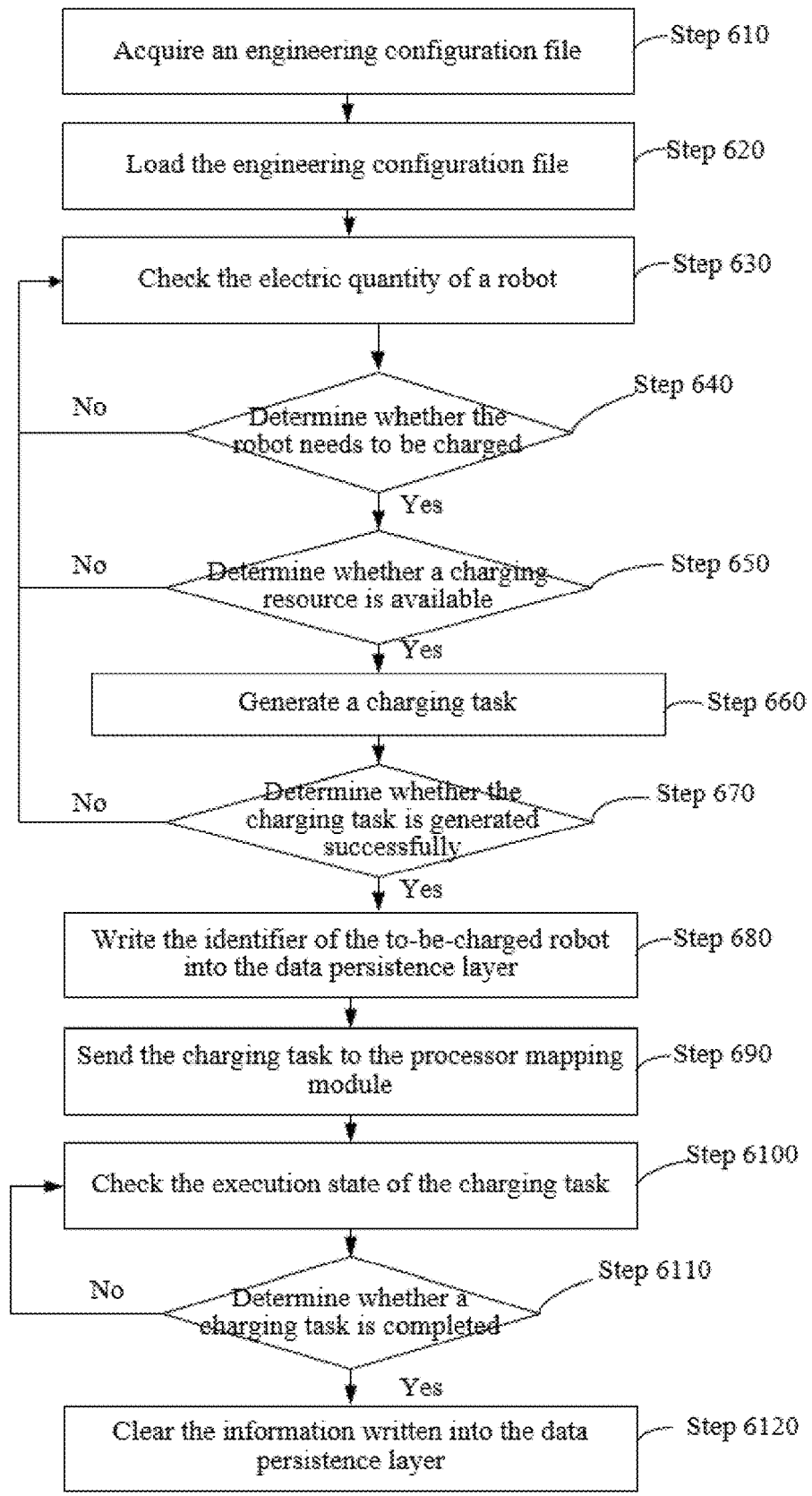
FIG. 4 is a flowchart of implementation by the charging management module of the embodiment shown in FIG. 3.

FIG. 4 is a flowchart of implementation by the charging management module of the embodiment shown in FIG. 3. As shown in FIG. 4, when executed, the charging management module of the application layer of this embodiment performs the steps described below.

In step 610, an engineering configuration file is acquired. The charging management module acquires the engineering configuration file from the data persistence layer.

In step 620, the engineering configuration file is loaded, and the state acquisition module acquires a robot list from the engineering configuration file.

In step 630, the electric quantity of a robot is checked.

The charging management module checks the electric quantity of the robots according to the state data. In an embodiment, the charging management module determines which one of the electric quantity and the minimum electric quantity threshold of the robot is greater according to the state data.

In step 640, it is determined whether the robot needs to be charged. If it is determined that the robot does not need to be charged, the process returns to step 630. If it is determined that the robot needs to be charged, step 650 is performed.

When it is determined that the electric quantity of the robot is less than the minimum electric quantity threshold, it is determined that the robot needs to be charged. Optionally, it is also possible to determine a to-be-charged robot, that is, to determine the identifier of the to-be-charged robot.

In step 650, it is determined whether a charging resource is available, and the state acquisition module loads charging resource information from the engineering configuration file. If no charging resource is available, the process returns to step 630. If it is determined that a charging resource is available, step 660 is performed.

When it is determined that the robot needs to be charged, it is determined, according to information about the surrounding environment, whether a charging dock is available and whether the charging distance is less than a preset threshold. When it is determined that a charging dock is available and the charging distance is less than the preset threshold, it is determined that the charging resource is available.

When it is determined that the robot does not need to be charged, the process returns to step 630.

In step 660, a charging task is generated.

The charging task is generated when it is determined that a charging resource is available, Optionally, the charging task includes the identifier of the to-be-charged robot.

When it is determined that no charging resource is available, the process returns to step 630.

In step 670, it is determined whether the charging task is generated successfully. If it is determined that the charging task fails to be generated, step 630 is performed. If it is determined that the charging task is generated, step 680 is performed.

In step 680, the identifier of the to-be-charged robot is written into the data persistence layer.

In step 690, the charging task is sent to the processor mapping module.

In step 6100, the execution state of the charging task is checked.

In step 6110, it is determined whether a charging task is completed. If no charging task is completed, step 6100 is performed. If a charging task is completed, step 6120 is performed.

In step 6120, the information written into the data persistence layer is cleared.

In an embodiment, the user may send an operation instruction. The processor mapping module is further configured to receive the operation instruction sent by the user and forward the instruction to the task scheduling module, the traffic scheduling module or the charging management module after parsing the operation instruction. The task scheduling module, the traffic scheduling module or the charging management module is further configured to operate according to the operation instruction. The operation instruction includes at least one of task state query, task deletion, task suspension or robot state query.

Parsing the operation instruction means analyzing the type of the task in the operation instruction: when the type is a task, the task is forwarded to the task scheduling module; when the type is a charging task, the charging task is forwarded to the charging management module; when the type is a traffic planning request, the traffic planning request is forwarded to the traffic scheduling module.

The step in which the task scheduling module, the traffic scheduling module or the charging management module operates according to the operation instruction means that the three modules operate according to the action indicated by the operation instruction: when the operation instruction is a state query instruction, the current execution state is fed back; when the operation instruction is a deletion instruction, the related task is deleted; when the operation instruction is a task suspension instruction, the currently executed task is suspended; when the operation instruction is a robot state query instruction, the current robot state is fed back. The state of the robot may be a task execution state or an idle state.

For example, if the operation instruction is a charging task state query instruction, the processor mapping module parses the operation instruction after receiving the operation instruction, determines that the operation instruction instructs to query the state of the charging task, and forwards the operation instruction to the charging management module of the application layer, After receiving the operation instruction, the charging management module feeds back the charging state of the robot (for example, the amount of charging) according to the operation instruction.

With continued reference to FIG. 3, in this embodiment, the data persistence layer includes a relational database and a memory-level database. A task and a charging task are stored in the relational database. Control parameters are stored in the memory-level database. The state data of the robot is stored in the memory-level database. Hot backup data is stored in the memory-level database.

A relational database like My Structure Quest Language (MySQL) has the advantage that the data structure is more complex and thus can be queried according to complex conditions. A memory-level database like Remote Dictionary Server (Redis) database has the advantages that the query speed is fast and thus the database can be read and written frequently.

In this embodiment, the data persistence layer further includes a description file. The description file includes an engineering configuration file.

In the robot cluster scheduling system provided in this embodiment, on the one hand, the configuration in which the application layer includes a charging management module makes intelligent charging of a robot possible when the electric quantity of the robot is less than the threshold and thus improves the reliability of the robot; on the other hand, an operation instruction sent by a user can be processed so that the flexibility of the scheduling system is improved.

From the description of embodiments, it will be apparent to those skilled in the art that the present disclosure may be implemented by means of software and necessary general-purpose hardware or may be implemented by hardware. The computer software products may be stored in a computer-readable storage medium such as a computer floppy disk, a read-only memory (ROM), a random access memory (RAM), a flash memory, a hard disk, a CD or the like. The computer-readable storage medium is configured to include a plurality of instructions such that a computer device (which may be a personal computer, a server, a network device or the like) performs the methods described in the preceding embodiments.

What is claimed is:

1. A robot cluster scheduling system, comprising:
a user layer, which comprises a service object of the scheduling system, wherein the service object is a user or a robot;
an intermediate layer, which comprises a processor mapping module and a state acquisition module;
an application layer, which comprises a task scheduling module and a traffic scheduling module;
a plug-in layer, which comprises a task solving engine and a traffic planning engine; and
a data persistence layer;
wherein the processor mapping module is configured to receive a task sent by the user or a traffic planning request sent by the robot, and write the task into the data persistence layer or forward the traffic planning request to the traffic scheduling module of the application layer after parsing the task or the traffic planning request;
wherein the state acquisition module is configured to receive state data of robots and write the state data into the data persistence layer;
wherein the task scheduling module is configured to invoke the task solving engine after acquiring the task from the data persistence layer, and the task solving engine is configured to determine a target robot according to a parameter of the task and the state data and decompose the task into a subtask sequence and send the subtask sequence to the target robot;
wherein the traffic scheduling module is configured to invoke the traffic planning engine after receiving the traffic planning request from the processor mapping module, and the traffic planning engine is configured to determine a target route according to a parameter in the traffic planning request and the state data and send the target route to the robot that generates the traffic planning request;
wherein the task solving engine and the traffic planning engine each provide an application programming interface (API); and
wherein the intermediate layer, the application layer and the data persistence layer are each implemented using a virtualized container technology of an application container engine Docker.

2. The system of claim 1, wherein
the state data comprises electric quantity data of the robots;
the application layer further comprises a charging management module;
the charging management module is configured to
determine, according to the electric quantity data of the robots, whether the robots need to be charged;
determine, in response to determining that there is a robot to be charged, the to-be-charged robot and determine whether a charging resource is available; and
generate a charging task in response to determining that the charging resource is available and send the charging task to the processor mapping module, wherein the charging task comprises an identifier of the to-be-charged robot;
the processor mapping module is further configured to parse the charging task after receiving the charging task sent by the charging management module, and write the charging task into the data persistence layer; and
the task scheduling module is further configured to invoke the task solving engine after acquiring the charging task from the data persistence layer, and the task solving engine is configured to decompose the charging task into a charging subtask sequence and send the charging subtask sequence to the robot corresponding to the identifier.

3. The system of claim 2, wherein
the processor mapping module is further configured to receive an operation instruction sent by the user, and forward, after parsing the operation instruction, the operation instruction to the task scheduling module, the traffic scheduling module or the charging management module, wherein the operation instruction comprises at least one of task state query, task deletion, task suspension or robot state query; and
the task scheduling module, the traffic scheduling module or the charging management module is further configured to operate according to the operation instruction.

4. The system of claim 3, wherein
the task solving engine stores a plurality of task types and subtask sequence templates corresponding to the plurality of task types; and
the task solving engine is configured to determine a subtask sequence template corresponding to the task according to a type of the task, and substitute the parameter of the task into the subtask sequence template corresponding to the task, obtain the subtask sequence corresponding to the task and send the subtask sequence to the target robot.

5. The system of claim 3, wherein
the task solving engine stores an intelligent solution algorithm; and
the task solving engine is configured to determine the subtask sequence according to the intelligent solution algorithm and the parameter of the task and to send the subtask sequence to the target robot.

6. The system of claim 3, wherein
the data persistence layer is further configured to record task execution information and an execution state of the task;
the task scheduling module is further configured to change the execution state of the task from "not executed" to "being executed" after the task is decomposed into the subtask sequence; and
the task scheduling module is further configured to acquire the task execution information from the target robot after invoking the task solving engine to cause the task solving engine to send the subtask sequence to the target robot, and write the task execution information into the data persistence layer, wherein the task execution information is configured to indicate which subtask in the subtask sequence the task is executed.

7. The system of claim 3, wherein the intermediate layer, the application layer and the data persistence layer are each implemented using a virtualized container technology of the application container engine Docker.

8. The system of claim 2, wherein the data persistence layer is further configured to store control parameters of the robots, and the state acquisition module is further configured to acquire the control parameters from the data persistence layer after receiving the state data of the robots and send the control parameters to the robots, and wherein the control parameters comprise at least one of the following information: control modes of the robots or maximum speeds of the robots.

9. The system of claim 8, wherein the data persistence layer stores a relational database and a memory-level database, wherein the relational database is configured to store the task and the charging task, and the memory-level database is configured to store the control parameters.

10. The system of claim 9, wherein
the data persistence layer further stores a description file, and wherein the description file comprises an engineering configuration file; and
the task scheduling module, the traffic scheduling module and the charging management module are each configured to acquire the engineering configuration file from the description file and to load the engineering configuration file.

11. The system of claim 2, wherein
the task solving engine stores a plurality of task types and subtask sequence templates corresponding to the plurality of task types; and
the task solving engine is configured to determine a subtask sequence template corresponding to the task according to a type of the task, and substitute the parameter of the task into the subtask sequence template corresponding to the task, obtain the subtask sequence corresponding to the task and send the subtask sequence to the target robot.

12. The system of claim 2, wherein
the task solving engine stores an intelligent solution algorithm; and
the task solving engine is configured to determine the subtask sequence according to the intelligent solution algorithm and the parameter of the task and to send the subtask sequence to the target robot.

13. The system of claim 2, wherein
the data persistence layer is further configured to record task execution information and an execution state of the task;
the task scheduling module is further configured to change the execution state of the task from "not executed" to "being executed" after the task is decomposed into the subtask sequence; and
the task scheduling module is further configured to acquire the task execution information from the target robot after invoking the task solving engine to cause the task solving engine to send the subtask sequence to the target robot, and write the task execution information into the data persistence layer, wherein the task execution information is configured to indicate which subtask in the subtask sequence the task is executed.

14. The system of claim 2, wherein the intermediate layer, the application layer and the data persistence layer are each implemented using a virtualized container technology of the application container engine Docker.

15. The system of claim 1, wherein
the task solving engine stores a plurality of task types and subtask sequence templates corresponding to the plurality of task types; and
the task solving engine is configured to determine a subtask sequence template corresponding to the task according to a type of the task, and substitute the parameter of the task into the subtask sequence template corresponding to the task, obtain the subtask sequence corresponding to the task and send the subtask sequence to the target robot.

16. The system of claim 1, wherein
the task solving engine stores an intelligent solution algorithm; and
the task solving engine is configured to determine the subtask sequence according to the intelligent solution algorithm and the parameter of the task and to send the subtask sequence to the target robot.

17. The system of claim 1, wherein
the data persistence layer is further configured to record task execution information and an execution state of the task;
the task scheduling module is further configured to change the execution state of the task from "not executed" to "being executed" after the task is decomposed into the subtask sequence; and
the task scheduling module is further configured to acquire the task execution information from the target robot after invoking the task solving engine to cause the task solving engine to send the subtask sequence to the target robot, and write the task execution information into the data persistence layer, wherein the task execution information is configured to indicate which subtask in the subtask sequence the task is executed.

* * * * *